(12) United States Patent
Zhang et al.

(10) Patent No.: US 12,420,413 B2
(45) Date of Patent: Sep. 23, 2025

(54) DYNAMIC TARGET TRACKING METHOD, ROBOT AND COMPUTER-READABLE STORAGE MEDIUM

(71) Applicant: UBTECH ROBOTICS CORP LTD, Shenzhen (CN)

(72) Inventors: Jindi Zhang, Shenzhen (CN); Youjun Xiong, Shenzhen (CN); Meihui Zhang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 282 days.

(21) Appl. No.: 18/217,662

(22) Filed: Jul. 3, 2023

(65) Prior Publication Data

US 2024/0009841 A1 Jan. 11, 2024

(30) Foreign Application Priority Data

Jul. 8, 2022 (CN) .......................... 202210804647.4

(51) Int. Cl.
*B25J 9/16* (2006.01)
*B25J 17/00* (2006.01)

(52) U.S. Cl.
CPC ............. *B25J 9/1664* (2013.01); *B25J 9/161* (2013.01); *B25J 17/00* (2013.01)

(58) Field of Classification Search
CPC .......... B25J 9/161; B25J 9/1664; B25J 17/00; G05B 2219/40519
See application file for complete search history.

(56) References Cited

U.S. PATENT DOCUMENTS

| 6,278,906 | B1 * | 8/2001 | Piepmeier | B25J 9/1607 |
| | | | | 700/59 |
| 2007/0073439 | A1 * | 3/2007 | Habibi | G05B 19/4182 |
| | | | | 700/213 |
| 2011/0102814 | A1 * | 5/2011 | Okamura | H04N 7/188 |
| | | | | 348/142 |
| 2012/0307027 | A1 * | 12/2012 | Popovic | A61B 34/30 |
| | | | | 901/46 |
| 2016/0065912 | A1 * | 3/2016 | Peterson | G06T 7/70 |
| | | | | 348/86 |
| 2018/0050452 | A1 * | 2/2018 | Ou | B25J 9/1697 |
| 2020/0267366 | A1 * | 8/2020 | Kido | H04N 13/167 |
| 2022/0028117 | A1 * | 1/2022 | Mizohana | G06T 7/80 |

FOREIGN PATENT DOCUMENTS

| CN | 105700530 A | 6/2016 |
| CN | 114527769 A | 5/2022 |

* cited by examiner

*Primary Examiner* — Stephen Holwerda

(57) ABSTRACT

A dynamic target tracking method for a robot having multiple joints includes: obtaining a motion state of a tracked dynamic target in real time; performing motion prediction according to the motion state at a current moment to obtain a predicted position of the dynamic target; performing lag compensation on the predicted position to obtain a compensated predicted position; performing on-line trajectory planning according to the compensated predicted position to obtain planning quantities of multi-step joint motion states at multiple future moments, and determining a multi-step optimization trajectory according to the planning quantities and a multi-step optimization objective function; and controlling the joints of the robot to according to the multi-step optimization trajectory.

20 Claims, 5 Drawing Sheets

DYNAMIC TARGET TRACKING METHOD, ROBOT AND COMPUTER-READABLE STORAGE MEDIUM

CROSS REFERENCE TO RELATED APPLICATIONS

This application claims priority to Chinese Patent Application No. CN202210804647.4, filed Jul. 8, 2022, which is hereby incorporated by reference herein as if set forth in its entirety.

TECHNICAL FIELD

The present disclosure generally relates to robots, and particularly to a dynamic target tracking method, robot and computer-readable storage medium.

BACKGROUND

The basic problem of motion planning is to select a path, or trajectory, from a given initial state to a destination state, while avoiding collisions with known static and moving obstacles. Ideally, it is desirable that the trajectory to the goal be computed online, during motion, to allow the robot to react to changes in the environment, to a moving target, and to errors encountered during motion. However, the inherent difficulty in solving this problem, which stems from the high dimensionality of the search space, the geometric and kinematic properties of the obstacles, the cost function to be optimized, and the robot's kinematic and dynamic model, may hinder a sufficiently fast solution to be computed online, given reasonable computational resources. As a result, existing approach on motion planning can be classified into off-line and on-line planning. Off-line planners compute the entire path or trajectory to the goal before motion begins, whereas on-line planners generate the trajectory to the goal incrementally, during motion.

Robots use online trajectory planning to track dynamic targets. Currently, the main approach is to drive the online planner to generate online trajectories based on the error information of the tracked targets. However, in the tracking of dynamic targets, there is a certain delay in the collection and calculation of the vision installed on the robot, which means there is a lower visual feedback frequency, resulting in a significant lag error in the online planning trajectory compared to the dynamic target.

Therefore, there is a need to provide a dynamic target tracking method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
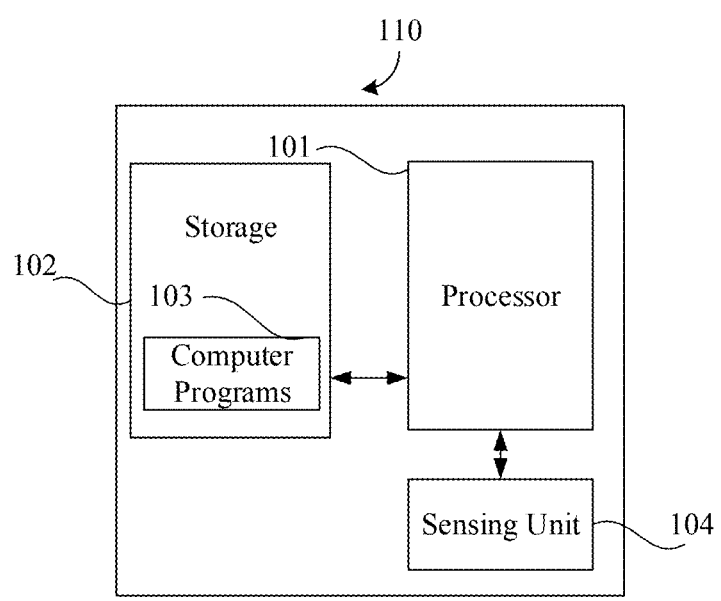
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 shows a schematic block diagram of robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the dynamic target tracking method, such as steps S110 to S150 in FIG. 2 and steps S210 and S220 in FIG. 3, and steps S310 to S330 in FIG. 4 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

Figure 5:
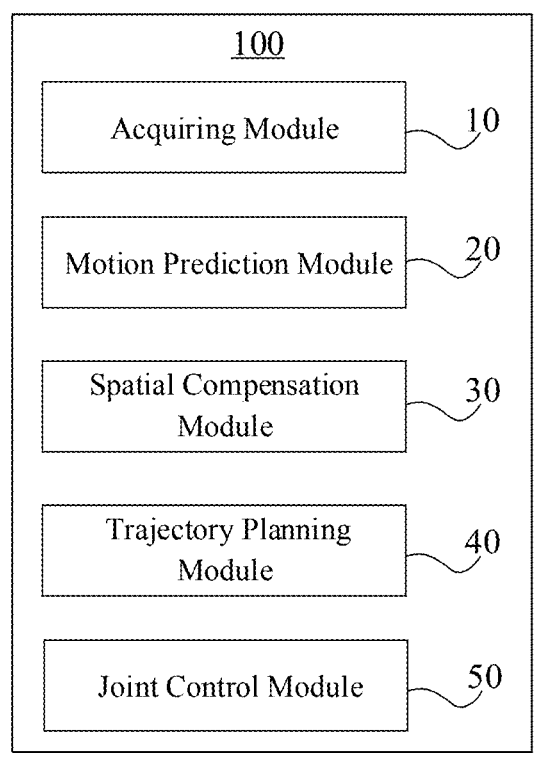
FIG. 5 is schematic block diagram of a dynamic target tracking according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into an acquiring module 10, a motion prediction module 20, a spatial compensation module 30, a trajectory planning module 40, and a joint control module 50 as shown in FIG. 5.

In one embodiment, the robot 110 may further include a sensing unit 104 that is electrically connected to the processor 101. The sensing unit 104 includes a number of sensors arranged on the robot, and these sensors are to detect necessary external information and state information of the robot to the control system of the robot, so as to provide necessary inputs for the robot to make decisions. In some cases, these sensors can be divided into internal sensors and external sensors. The internal sensors are to measure the state of the robot. Their functions are to measure the kinematics and mechanical variables, which are used for the robot to determine its own motion state, so that the robot can move according to the specified parameters such as position, trajectory and speed. The external sensors are to detect the mutual information between the robot itself and the environment, such as vision and other information. The external sensors may include but are not limited to proximity sensors, vision sensors, and the like. For example, in one embodiment, the real-time position, speed, acceleration and other motion states of a dynamic target tracked by the robot are obtained through visual feedback. It should be understood that the sensors listed above can be selectively arranged according to actual application scenarios.

It should be noted that the block diagram shown in FIG. 1 is only an example of the robot 110. The robot 110 may include more or fewer components than what is shown in FIG. 1, or have a different configuration than what is shown in FIG. 1. Each component shown in FIG. 1 may be implemented in hardware, software, or a combination thereof.

The robot 110 can be, but not limited to, an industrial robotic arm, a surgical robotic arm, a mobile robot, etc. Taking a mobile robot as an example, it can be a wheeled robot with rolling wheels, such as an inspection robot, or a legged robot with two legs, three legs or more. The robot here is a generalized robot, and its type is not limited. The method described in the embodiments below can be implemented in various application scenarios that require dynamic target tracking. For example, application scenarios may include, but are not limited to, real-time tracking of moving targets by mobile robots, dynamic grinding operations and dynamic trajectory tracking operations of industrial robotic arms, dynamic cutting operations by a surgical robotic arm, etc. It can be understood that, as a tracked object, the state of the tracked target in this embodiment is dynamic. The method described in the embodiments below can be implemented in scenes such as vehicles tracking dynamic targets.

Based on the above-mentioned robot structure, the present disclosure proposes a dynamic target tracking method. The method predicts the motion of a dynamic target in time, and then compensates the lag in space, while performing online trajectory optimization based on model prediction, which not only can effectively reduce the lag problem of the robot when tracking a dynamic target, but also can obtain a smooth motion trajectory, thereby improving system stability.

Figure 2:
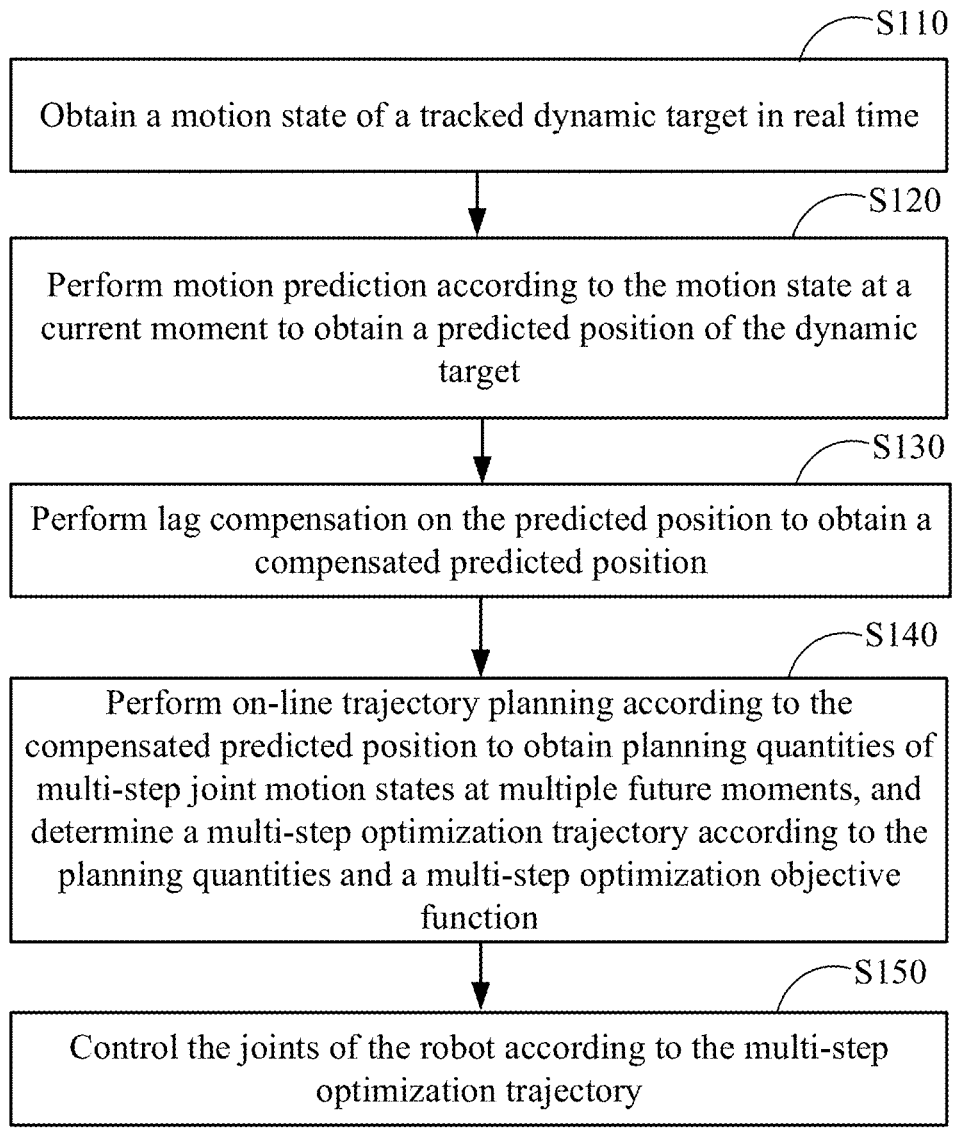
FIG. 2 is an exemplary flowchart of a dynamic target tracking method according to one embodiment.

FIG. 2 is an exemplary flowchart of a dynamic target tracking method according to one embodiment. As an example, but not a limitation, the method can be implemented by the robot 110. The method may include the following steps.

Step S110: Obtain a motion state of a tracked dynamic target in real time.

The motion state of the dynamic object may include, but not limited to, the actual position and attitude (i.e., pose), actual speed, actual acceleration, actual jerk, etc. at each movement moment. For example, the robot can directly or indirectly calculate the motion state of the dynamic target through approaches such as visual feedback and distance perception, and then track the dynamic target according to the motion state information. It can be understood that, ideally, the motion state of the robot should be consistent with the motion state of the dynamic target, so as to achieve real-time tracking.

When tracking a dynamic target based on visual feedback, the frequency of visual feedback obtained by the robot is low. The pose of the visual feedback is often not equal to the real-time pose of the dynamic target in time, resulting in a certain lag error in the online planning trajectory obtained based on the pose of the visual feedback relative to the real dynamic target.

Step S120: Perform motion prediction according to the motion state at a current moment to obtain a predicted position of the dynamic target.

Motion prediction refers to treating the motion of a dynamic target as a uniformly accelerated motion in a short period of time, and then predicting its future motion position, that is, the above-mentioned predicted position. Exemplarily, after obtaining the actual position of the dynamic target, the state quantities such as the speed and acceleration of the dynamic target at the current moment can be obtained by finding the first derivative and second derivative of the real-time position or using the discrete calculation of the actual position of several adjacent frames. Then, the predicted position of the dynamic target at the next moment can be calculated using these state quantities according to motion prediction principles.

Figure 3:
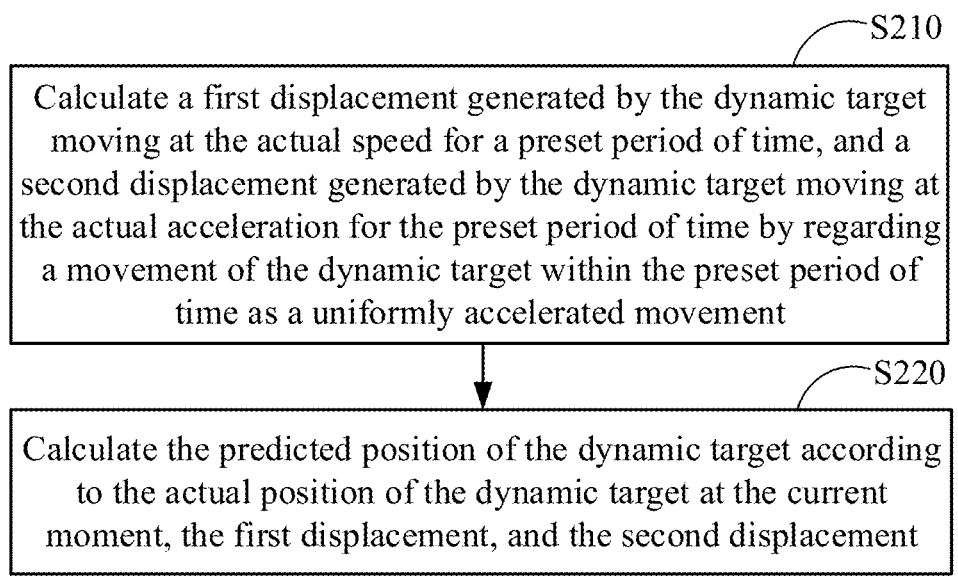
FIG. 3 is an exemplary flowchart of a method for motion prediction according to one embodiment.
Figure 4:
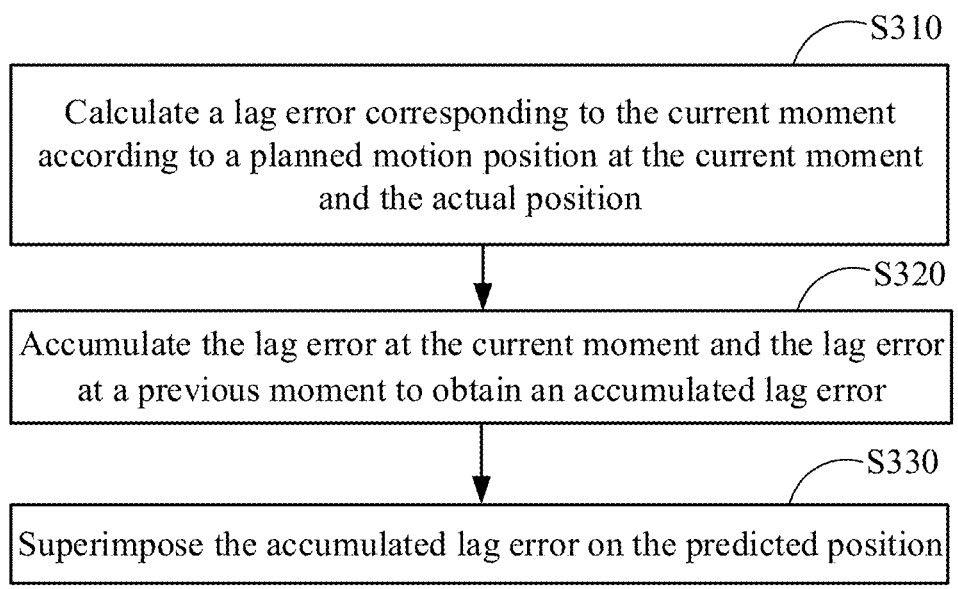
FIG. 4 an exemplary flowchart of a method for lag compensation according to one embodiment.

Referring to FIG. 3, in one embodiment, step S120 may include the following steps.

Step S210: Calculate a first displacement generated by the dynamic target moving at the actual speed for a preset period of time, and a second displacement generated by the dynamic target moving at the actual acceleration for the preset period of time by regarding a movement of the dynamic target within the preset period of time as a uniformly accelerated movement.

Step S220: Calculate the predicted position of the dynamic target according to the actual position of the dynamic target at the current moment, the first displacement, and the second displacement.

In one embodiment, the predicted position of the dynamic target can be calculated according to the following equation:

$$p_{pro} = p_{fb} + v_{fb}dt + \frac{1}{2}a_{fb}dt^2,$$

where $p_{pro}$ represents the predicted position of the dynamic target, $p_{fb}$, $v_{fb}$, and $a_{fb}$ represent the actual position, actual speed and actual acceleration of the dynamic target at the current moment, respectively, dt represents the preset period of time (e.g., a motion moment or a control instruction cycle). It can be understood that in the equation above, the first term on the right side of the equal sign is the actual position at the current moment, and the second and third terms are respectively the first displacement and the second displacement generated within the preset period of time.

If on-line trajectory planning is directly planned based on the predicted position, due to the structure of the robot itself or other factors, there will still be a certain error in the planned motion position relative to the fed-back actual position. For this reason, the method may further include performing lag compensation in the motion space of the robot.

Step S130: Perform lag compensation on the predicted position to obtain a compensated predicted position.

The lag compensation here means compensating the above-mentioned predicted position using the position lag error generated between the planned motion position and the actual position of the robot.

Referring to FIG. 4, in one embodiment, step S130 may include the following steps.

Step S310: Calculate a lag error corresponding to the current moment according to a planned motion position at the current moment and the actual position.

Step S320: Accumulate the lag error at the current moment and the lag error at a previous moment to obtain an accumulated lag error.

Step S330: Superimpose the accumulated lag error on the predicted position.

For example, if the planned output of the online planner at the current moment t is $p_{exp}$, and the actual position obtained by the visual feedback is $p_{fb}$, then the lag error $e_t$ corresponding to the current moment t is the difference between the two, that is, $e_t = p_{exp} - p_{fb}$. In addition, since there is an accumulated historical lag error before the current moment t, the following equation can be used to calculate the accumulated lag error:

$$e_{acc}^t = e_{acc}^{t-1} + we_t,$$

where $$e_{acc}^t$$

represents the accumulated lag error at the current moment, $$e_{acc}^{t-1}$$

represents the accumulated lag error at the previous moment, $e_t$ represents the lag error at the current moment, and w represents a preset weight value.

Thus, the compensated predicted position can be obtained by compensating the generated accumulated lag error $$e_{acc}^t$$

to the predicted position $p_{pro}$ of the dynamic target. Then, the compensated predicted position is taken as an input and brought into the online planner for online planning, so as to obtain the planned trajectory of the robot tracking the dynamic target.

Step S140: Perform on-line trajectory planning according to the compensated predicted position to obtain planning quantities of multi-step joint motion states at multiple future moments, and determine a multi-step optimization trajectory according to the planning quantities and a multi-step optimization objective function.

In one embodiment, the idea of model predictive control will be used to realize online trajectory planning, which can be realized by multi-step planning plus multi-step optimization. Multi-step planning is to predict the motion state (i.e., the planning quantities) of the joints of the robot at multiple moments in the future through a trajectory prediction model. Multi-step optimization is to solve a set of future state control variables through an optimization function, so that the actual output at multiple moments in the future is as close as possible to the desired output determined by a reference trajectory.

Exemplarily, before online planning, joint motion state quantities at the current moment can be calculated based on the compensated predicted position. Then, the planning quantities of the multi-step joint motion states for trajectory planning at future continuous moments can be calculated according to the joint motion state quantities at the current moment and a trajectory prediction model. The trajectory prediction model can be constructed based on a relationship between the joint motion state quantities at the current moment and joint motion state quantities at a next moment. In one embodiment, the trajectory prediction model can be constructed according to the following equations:

$$p_{i+1} = p_i + v_i dt + \frac{1}{2} a_i dt^2 + \frac{1}{6} j_i dt^3;$$

$$v_{i+1} = v_i + a_i dt + \frac{1}{2} j_i dt^2; a_{i+1} = a_i + j_i dt,$$

where $a_i$, $v_i$ and $p_i$ are state quantities at the i-th moment (current moment), which represent acceleration, velocity, and position; $j_i$ is the jerk at the current moment, which can be obtained by finding the derivative of the acceleration; $a_{i+1}$, $v_{i+1}$ and $p_{i+1}$ represent acceleration, velocity, and position at the i+1-th moment (next moment).

It can be understood that through multiple iterations of the trajectory prediction model above, the prediction of multi-step position, multi-step speed and multi-step acceleration, which are also referred to as planning quantities, can be realized. Assuming that it needs to predict the joint motion state at k moments in the future, the k-step motion state of the predicted output can be expressed in matrix form, as follows: $P_k = T_p J_k + B_p$; $V_k = T_v J_k + B_v$; $A_k = T_a J_k + B_a$; where $P_k$ represents a multi-step position matrix and $P_k = [p_i\ p_{i+1}\ p_{i+2}\ \cdots\ p_{i+k}]^T$, $V_k$ represents a multi-step speed matrix and $V_k = [v_i\ v_{i+1}\ v_{1+2}\ \cdots\ v_{i+k}]^T$, $A_k$ represents a multi-step acceleration matrix and $A_k = [a_i\ a_{i+1}\ a_{i+2}\ \cdots\ a_{i+k}]^T$, $J_k$ represents a multi-step jerk matrix and $J_k = [J_i\ J_{i+1}\ J_{i+2}\ \cdots\ J_{i+k}]^T$, $T_p$, $B_p$, $T_v$, $B_v$, $T_a$, $B_a$ represent the corresponding parameter matrices, which can be obtained from the corresponding parameters in the trajectory prediction model, and will not be described here. It should be noted that in this embodiment, the compensated predicted position (denoted as $p_{obj}$) is input into the trajectory prediction model, so the above-mentioned multi-step position matrix can be expressed as follows:

$$p_{obj}^k = [p_{obj}^i\ p_{obj}^{i+1}\ p_{obj}^{i+2}\ \cdots\ p_{obj}^{i+k}]^T.$$

In one embodiment, a set of optimal trajectory parameters for robot joint control can be determined by using the trajectory prediction model for multi-step planning, and then taking the obtained multi-step planning quantities as input and substituting the input into a pre-built multi-step optimization objective function for optimal solution.

The construction of the multi-step optimization objective function depends on the set optimization objectives, and when the number or objects of the optimization objectives are different, the constructed objective functions will also be different. In one embodiment, two optimization objectives are taken as an example. The multi-step optimization objective function is constructed with taking multi-step positions and multi-step speeds of the joints of the robot back to origins thereof as the first objective, and minimizing a multi-step position error when tracking the dynamic target as the second objective. In this case, the optimization objective function is expressed as follows:

$$\min \omega_1 (P_k - P_{obj}^k)^T (P_k - P_{obj}^k) + \omega_2 V_k^T V_k + \omega_3 A_k^T A_k,$$

where $P_k$ represents a position matrix composed of k-step position planning quantities, $V_k$ represents a speed matrix composed of k-step speed planning quantities, $A_k$ represents an acceleration matrix composed of k-step acceleration planning quantities, $$P_{obj}^k$$

represents a matrix composed of predicted positions after k-step compensation, and $\omega_1$, $\omega_2$, and $\omega_3$ represent three preset weights. For example, each preset weight can take a value from 0 to 1, which is not limited here.

The state control quantities solved by the multi-step optimization objective function constructed based on the above-mentioned two optimization objectives can achieve small lag and smooth trajectory during compatible tracking. It should be noted that the multi-step optimization objective function is not limited to the above-mentioned expression. In another embodiment, the multi-step optimization objective function can be constructed according to other tasks or other function types. For example, taking a task as an example, the optimization objective can be to minimize energy loss when tracking a dynamic target. For another example, taking the function type as an example, functions such as the square of the difference between each state quantity and the corresponding control quantity can also be used to construct the above multi-step optimization objective function, which is not limited here.

In one embodiment, in order to solve a set of optimal control variables, it needs to set the constraints of the multi-step optimization objective function. For example, the constraints may include, but are not limited to, physical constraints (e.g., unreachable upper and lower limits) on the motion position, speed, acceleration, and jerk of each joint of the robot. In addition, more constraints can be added according to actual requirements, which are not limited here.

Step S150: Control the joints of the robot to according to the multi-step optimization trajectory.

Exemplarily, when a set of optimal control variables (i.e., the control output of the above-mentioned k steps in the future) is obtained by solving the multi-step optimization objective function, the robot uses the set of optimal control variables as the trajectory parameters of online planning to calculate joint control commands, and then controls joint motors of the robot, so that the robot can move according to the planned trajectory. In addition, the robot continues to feed back the motion state of the current dynamic target at a set frequency, and this motion state will be reused to execute steps S120-S150 described above, which will be repeated until the current dynamic target tracking task is completed or stopped. It can be understood that when the online trajectory planning is performed, a calculation is performed according to the above-mentioned steps after each step is executed, thereby obtaining a trajectory with a small lag and a smooth trajectory.

By implementing the method described in the embodiments above, it can realize the real-time tracking of dynamic targets, which can not only effectively reduce the lag problem of the robot when tracking dynamic targets, but also obtain a smooth trajectory, thereby improving the stability of the robot.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 5, in one embodiment, a dynamic target tracking device 100 may include an acquiring module 10, a motion prediction module 20, a spatial compensation module 30, a trajectory planning module 40, and a joint control module 50. The acquiring module 10 is to obtain a motion state of a tracked dynamic target in real time. The motion state may include, but not limited to, the actual position, actual speed, and actual acceleration of the dynamic target at the current moment. The motion prediction module 20 is to perform motion prediction according to the motion state at a current moment to obtain a predicted position of the dynamic target. The spatial compensation module 30 is to perform lag compensation on the predicted position to obtain a compensated predicted position. The trajectory planning module 40 is to perform on-line trajectory planning according to the compensated predicted position to obtain planning quantities of multi-step joint motion states at multiple future moments, and determine a multi-step optimization trajectory according to the planning quantities and a multi-step optimization objective function. The joint control module 50 is to control the joints of the robot to according to the multi-step optimization trajectory.

In one embodiment, the motion prediction module 20 includes a displacement calculation submodule and a prediction calculation submodule. The displacement calculation submodule is to calculate a first displacement generated by the dynamic target moving at the actual speed for a preset period of time, and a second displacement generated by the dynamic target moving at the actual acceleration for the preset period of time by regarding a movement of the dynamic target within the preset period of time as a uniformly accelerated movement. The prediction calculation submodule is to calculate the predicted position of the dynamic target according to the actual position of the dynamic target at the current moment, the first displacement, and the second displacement.

In one embodiment, the spatial compensation module 30 includes an error calculation submodule and a compensation superposition submodule. The error calculation submodule is to calculate a lag error corresponding to the current moment according to a planned motion position at the current moment and the actual position, and accumulate the lag error at the current moment and the lag error at a previous moment to obtain an accumulated lag error. The compensation superposition submodule is to superimpose the accumulated lag error on the predicted position.

It can be understood that the device in the embodiments above corresponds to the method in the embodiments above. The basic principles and technical effects of the device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented dynamic target tracking method for a robot comprising a plurality of joints, the method comprising:
    obtaining a motion state of a tracked dynamic target in real time;
    performing motion prediction according to the motion state at a current moment to obtain a predicted position of the dynamic target;
    performing lag compensation on the predicted position to obtain a compensated predicted position;
    performing on-line trajectory planning according to the compensated predicted position to obtain planning quantities of multi-step joint motion states at multiple future moments, and determining a multi-step optimization trajectory according to the planning quantities and a multi-step optimization objective function; and
    controlling the joints of the robot to according to the multi-step optimization trajectory.

2. The method of claim 1, wherein the motion state comprises an actual position, an actual speed and an actual acceleration of the dynamic target at the current moment; performing motion prediction according to the motion state at the current moment to obtain the predicted position of the dynamic target comprises:
    calculating a first displacement generated by the dynamic target moving at the actual speed for a preset period of time, and a second displacement generated by the dynamic target moving at the actual acceleration for the preset period of time by regarding a movement of the dynamic target within the preset period of time as a uniformly accelerated movement; and
    calculating the predicted position of the dynamic target according to the actual position of the dynamic target at the current moment, the first displacement, and the second displacement.

3. The method of claim 2, wherein performing lag compensation on the predicted position comprises:
    calculating a lag error corresponding to the current moment according to a planned motion position at the current moment and the actual position, and accumulating the lag error at the current moment and the lag error at a previous moment to obtain an accumulated lag error; and
    superimposing the accumulated lag error on the predicted position.

4. The method of claim 1, wherein performing on-line trajectory planning according to the compensated predicted position to obtain planning quantities of multi-step joint motion states at multiple future moments comprises:
    calculating joint motion state quantities at the current moment based on the compensated predicted position; and
    calculating the planning quantities of the multi-step joint motion states for trajectory planning at future continuous moments according to the joint motion state quantities at the current moment and a trajectory prediction model constructed based on a relationship between the joint motion state quantities at the current moment and joint motion state quantities at a next moment.

5. The method of claim 4, wherein the multi-step optimization objective function is constructed with taking multi-step positions and multi-step speeds of the joints of the robot back to origins thereof as a first objective, and minimizing a multi-step position error when tracking the dynamic target as a second objective; constraint conditions of the multi-step optimization objective function comprise physical constraints satisfied by position, speed and acceleration of the joints of the robot.

6. The method of claim 5, wherein the multi-step optimization objective function is expressed as follows:

$$\min \omega_1 (P_k - P_{obj}^k)^T (P_k - P_{obj}^k) + \omega_2 V_k^T V_k + \omega_3 A_k^T A_k,$$

where $P_k$ represents a position matrix composed of k-step position planning quantities, $V_k$ represents a speed matrix composed of k-step speed planning quantities, $A_k$ represents an acceleration matrix composed of k-step acceleration planning quantities, $$P_{obj}^k$$

represents a matrix composed of predicted positions after k-step compensation, and $\omega_1$, $\omega_2$, and $\omega_3$ represent three preset weights.

7. The method of claim 1, wherein the predicted position of the dynamic target is calculated according to the following equation $$p_{pro} = p_{fb} + v_{fb} dt + \frac{1}{2} a_{fb} dt^2,$$

where $p_{pro}$ represents the predicted position of the dynamic target, $p_{fb}$, $v_{fb}$, and $a_{fb}$ represent an actual position, an actual speed and an actual acceleration of the dynamic target at the current moment, and dt represents a preset period of time.

8. A robot comprising:
one or more processors; and
a memory coupled to the one or more processors, the memory storing programs that, when executed by the one or more processors of a robot comprising a plurality of joints, cause performance of operations comprising:
obtaining a motion state of a tracked dynamic target in real time;
performing motion prediction according to the motion state at a current moment to obtain a predicted position of the dynamic target;
performing lag compensation on the predicted position to obtain a compensated predicted position;
performing on-line trajectory planning according to the compensated predicted position to obtain planning quantities of multi-step joint motion states at multiple future moments, and determining a multi-step optimization trajectory according to the planning quantities and a multi-step optimization objective function; and
controlling the joints of the robot to according to the multi-step optimization trajectory.

9. The robot of claim 8, wherein the motion state comprises an actual position, an actual speed and an actual acceleration of the dynamic target at the current moment; performing motion prediction according to the motion state at the current moment to obtain the predicted position of the dynamic target comprises:
calculating a first displacement generated by the dynamic target moving at the actual speed for a preset period of time, and a second displacement generated by the dynamic target moving at the actual acceleration for the preset period of time by regarding a movement of the dynamic target within the preset period of time as a uniformly accelerated movement; and
calculating the predicted position of the dynamic target according to the actual position of the dynamic target at the current moment, the first displacement, and the second displacement.

10. The robot of claim 9, wherein performing lag compensation on the predicted position comprises:
calculating a lag error corresponding to the current moment according to a planned motion position at the current moment and the actual position, and accumulating the lag error at the current moment and the lag error at a previous moment to obtain an accumulated lag error; and
superimposing the accumulated lag error on the predicted position.

11. The robot of claim 8, wherein performing on-line trajectory planning according to the compensated predicted position to obtain planning quantities of multi-step joint motion states at multiple future moments comprises:
calculating joint motion state quantities at the current moment based on the compensated predicted position; and
calculating the planning quantities of the multi-step joint motion states for trajectory planning at future continuous moments according to the joint motion state quantities at the current moment and a trajectory prediction model constructed based on a relationship between the joint motion state quantities at the current moment and joint motion state quantities at a next moment.

12. The robot of claim 11, wherein the multi-step optimization objective function is constructed with taking multi-step positions and multi-step speeds of the joints of the robot back to origins thereof as a first objective, and minimizing a multi-step position error when tracking the dynamic target as a second objective; constraint conditions of the multi-step optimization objective function comprise physical constraints satisfied by position, speed and acceleration of the joints of the robot.

13. The robot of claim 12, wherein the multi-step optimization objective function is expressed as follows:

$$\min \omega_1 (P_k - P_{obj}^k)^T (P_k - P_{obj}^k) + \omega_2 V_k^T V_k + \omega_3 A_k^T A_k,$$

where $P_k$ represents a position matrix composed of k-step position planning quantities, $V_k$ represents a speed matrix composed of k-step speed planning quantities, $A_k$ represents an acceleration matrix composed of k-step acceleration planning quantities, $$P_{obj}^k$$

represents a matrix composed of predicted positions after k-step compensation, and $\omega_1$, $\omega_2$, and $\omega_3$ represent three preset weights.

14. The robot of claim 8 wherein the predicted position of the dynamic target is calculated according to the following equation $$p_{pro} = p_{fb} + v_{fb} dt + \frac{1}{2} a_{fb} dt^2,$$

where $p_{pro}$ represents the predicted position of the dynamic target, $p_{fb}$, $v_{fb}$, and $a_{fb}$ represent an actual position, an actual speed and an actual acceleration of the dynamic target at the current moment, and dt represents a preset period of time.

15. A non-transitory computer-readable storage medium storing instructions that, when executed by at least one processor of a robot comprising a plurality of joints, cause the at least one processor to perform a method, the method comprising:

obtaining a motion state of a tracked dynamic target in real time;

performing motion prediction according to the motion state at a current moment to obtain a predicted position of the dynamic target;

performing lag compensation on the predicted position to obtain a compensated predicted position;

performing on-line trajectory planning according to the compensated predicted position to obtain planning quantities of multi-step joint motion states at multiple future moments, and determining a multi-step optimization trajectory according to the planning quantities and a multi-step optimization objective function; and controlling the joints of the robot to according to the multi-step optimization trajectory.

16. The non-transitory computer-readable storage medium of claim 15, wherein the motion state comprises an actual position, an actual speed and an actual acceleration of the dynamic target at the current moment; performing motion prediction according to the motion state at the current moment to obtain the predicted position of the dynamic target comprises:

calculating a first displacement generated by the dynamic target moving at the actual speed for a preset period of time, and a second displacement generated by the dynamic target moving at the actual acceleration for the preset period of time by regarding a movement of the dynamic target within the preset period of time as a uniformly accelerated movement; and calculating the predicted position of the dynamic target according to the actual position of the dynamic target at the current moment, the first displacement, and the second displacement.

17. The non-transitory computer-readable storage medium of claim 16, wherein performing lag compensation on the predicted position comprises:

calculating a lag error corresponding to the current moment according to a planned motion position at the current moment and the actual position, and accumulating the lag error at the current moment and the lag error at a previous moment to obtain an accumulated lag error; and superimposing the accumulated lag error on the predicted position.

18. The non-transitory computer-readable storage medium of claim 15, wherein performing on-line trajectory planning according to the compensated predicted position to obtain planning quantities of multi-step joint motion states at multiple future moments comprises:

calculating joint motion state quantities at the current moment based on the compensated predicted position; and calculating the planning quantities of the multi-step joint motion states for trajectory planning at future continuous moments according to the joint motion state quantities at the current moment and a trajectory prediction model constructed based on a relationship between the joint motion state quantities at the current moment and joint motion state quantities at a next moment.

19. The non-transitory computer-readable storage medium of claim 18, wherein the multi-step optimization objective function is constructed with taking multi-step positions and multi-step speeds of the joints of the robot back to origins thereof as a first objective, and minimizing a multi-step position error when tracking the dynamic target as a second objective; constraint conditions of the multi-step optimization objective function comprise physical constraints satisfied by position, speed and acceleration of the joints of the robot.

20. The non-transitory computer-readable storage medium of claim 19, wherein the multi-step optimization objective function is expressed as follows:

$$\min \omega_1 (P_k - P_{obj}^k)^T (P_k - P_{obj}^k) + \omega_2 V_k^T V_k + \omega_3 A_k^T A_k,$$

where $P_k$ represents a position matrix composed of k-step position planning quantities, $V_k$ represents a speed matrix composed of k-step speed planning quantities, $A_k$ represents an acceleration matrix composed of k-step acceleration planning quantities, $$P_{obj}^k$$

represents a matrix composed of predicted positions after k-step compensation, and $\omega_1$, $\omega_2$, and $\omega_3$ represent three preset weights.

* * * * *